T. B. FERGUSON.
LIQUID FUEL BURNER.
APPLICATION FILED JAN. 12, 1916.

1,278,620.

Patented Sept. 10, 1918.
2 SHEETS—SHEET 1.

Thomas B. Ferguson, Inventor
By Louis M. Sanders, Attorney

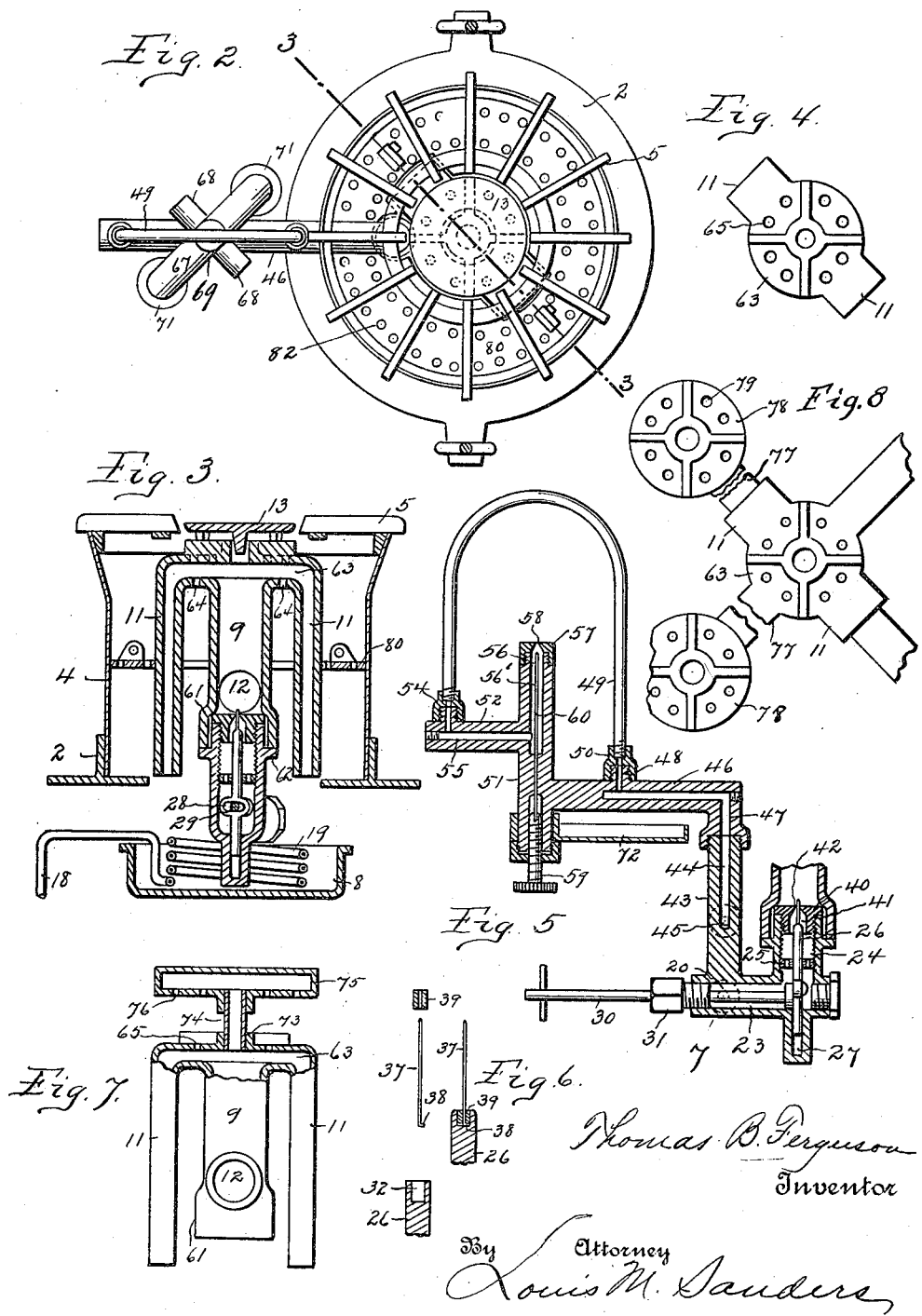

UNITED STATES PATENT OFFICE.

THOMAS B. FERGUSON, OF BROOKLYN, NEW YORK, ASSIGNOR TO STANDARD STOVE & LIGHT COMPANY, A CORPORATION OF NEW JERSEY.

LIQUID-FUEL BURNER.

1,278,620.   Specification of Letters Patent.   Patented Sept. 10, 1918.

Application filed January 12, 1916. Serial No. 71,607.

*To all whom it may concern:*

Be it known that I, THOMAS B. FERGUSON, a citizen of the United States, and a resident of Brooklyn, city of New York, county of Kings, and State of New York, have invented certain new and useful Improvements in Liquid-Fuel Burners, of which the following is a specification.

My invention relates to burners for kerosene and for other liquid hydro-carbons, and is intended for producing an intense heating flame; the burner is adapted for use in heaters of various kinds, for example, cooking ranges, furnaces, water heaters, tinners' and plumbers' fire-pots, and other various uses.

The particular improvement of the present invention resides more specifically in the provision of a mixing chamber for the vaporizing of the fuel and the mixing with it of heated air. It is quite well known that vaporized hydro-carbon at comparatively high temperature will not mix with cold air, neither will a cold hydro-carbon gas mix with heated air. The specific purpose of the improvement is to bring both the vaporized hydro-carbon and the air to a comparatively high temperature before they are brought together to form the requisite mixture for a high temperature heating flame.

The means whereby I am enabled to carry out the specific purpose of my invention are set forth in the following specification and illustrated in the accompanying drawings, wherein—

Fig. 2, is a plan view of the same.

Fig. 3, is a vertical section of a portion of my improvement taken on line 3—3 of Fig. 2.

Fig. 4, is a detached plan view of the mixing chamber.

Fig. 5, is a diagrammatic sectional view of the fuel feed combined with the feeding mechanism for a separate light.

Fig. 6, represents the separate and assembled details of the cleaning needle for the feeding nozzle.

Fig. 7, is a detached side elevation, partly in section, of the mixing chamber provided with a separate spreader adapting the burner for tinners' and plumbers' use.

Fig. 8, illustrates in plan the adaptation of the mixing chamber for the distribution of the fuel mixture to several separate fuel burners as used in a cooking range.

Similar letters of reference refer to like parts throughout the specification and drawings.

Figure 1:
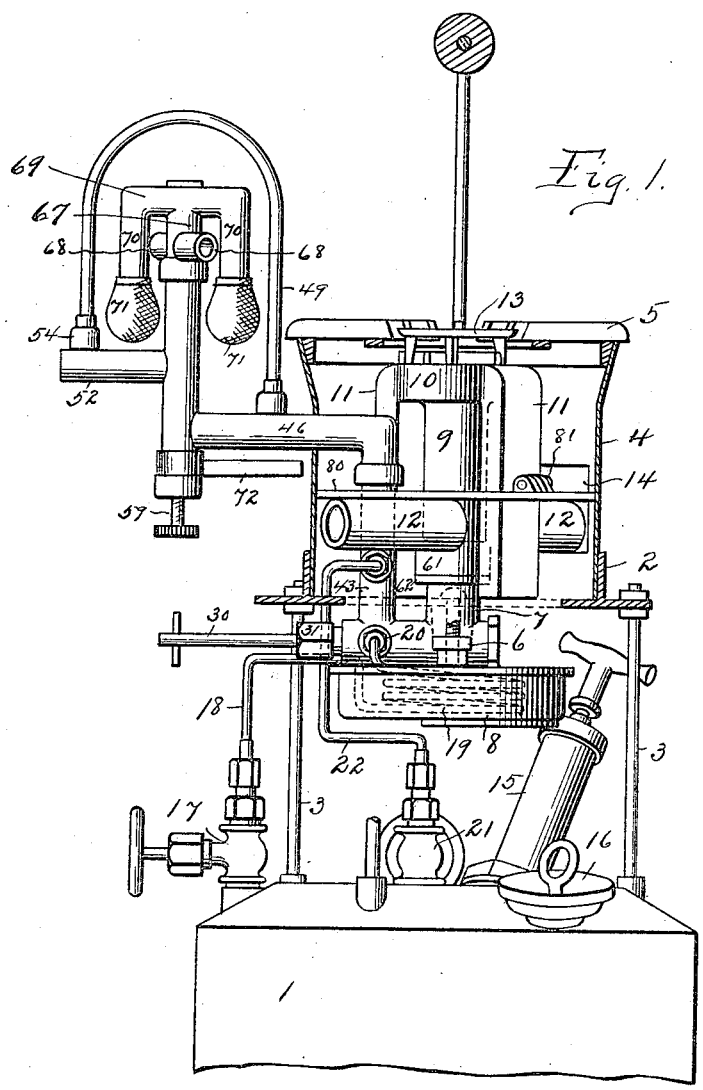
Figure 1, is a general side elevation, partly in section, of my improved burner.

The fuel tank 1, as shown in Fig. 1, may be of any suitable or desired form, and while I have shown my burner mechanism as mounted thereon, yet that this is not essential is quite apparent for the reason that the burner may be located at a distance from the tank and suitable pipes led from the same to the burner device. As shown, however, there is mounted upon the upper side of the tank the circular supporting casting 2, supported from the tank by the three upright standards 3. This supporting casting 2, is provided with an upwardly projecting flange within which is fitted the tubular combustion chamber 4, extending upwardly to the requisite height and having supported upon its upper flared edge, the grate 5, upon which any article or cooking utensil may be supported. Suitably mounted upon the casting 2, by means of the lateral supporting lugs 6, is the feeding mechanism 7, the details of which will be more fully hereinafter described. Supported also from the casting 2, is the pre-heating pan, or reservoir 8. Detachably supported upon a vertical tubular extension of the feeding device 7, is the mixing chamber 9, having at its upper extremity the hollow circular chamber 10, from which the two lateral downwardly extending tubular fuel conductors or flues 11 are led. The mixing chamber 9 is provided with two lateral air inlets 12. Detachably supported upon the upper side of the hollow circular chamber 10, is the small cast speader 13. Lateral openings 14, are provided in the heating chamber 4, through which the air inlets 12 may project into the open air.

The fuel in the tank is put under considerable pressure by any suitable pressure pump, as for example, the small hand pump 15, mounted upon the side of the tank 1, and operated in the usual manner of the ordinary bicycle pump. The usual funnel opening 16 is provided in the tank whereby its contents may be replenished. The fuel under pressure is conducted from the tank 1 to the feeding mechanism 7, through the ordinary globe valve 17, by way of the pipe 18, said pipe being carried to the pre-heating reservoir or pan, and coiled therein as shown at 19, and then led to the feeding device through the nipple 20. A similar globe valve 21 and pipe 22, may be used to conduct the fuel from the tank 1 to that part of the fuel feeding device which feeds the lighting mechanism hereinafter to be described.

The fuel feeding mechanism consists of a casting substantially as shown in Fig. 5; this casting is provided with the horizontal tubular portion 23, and the vertical tubular screw-threaded extension 24. Within this vertical extension 24, is secured the small apertured and screw-threaded spider 25, which serves as a guide for the cleaning stem 26; the opposite end of the cleaning stem being carried in a guiding extension 27 upon the lower side of the device 7. The purpose of the two guides 25 and 27 is to cause the cleaning stem 26 to have exact rectilinear motion. The central portion of the stem is provided with a lateral elongated slot 28, to receive an eccentric pin 29, mounted upon the end of the rotating stem 30; the latter being held in position by the packing gland 31. From this description it will be seen that the rotation of the stem 30 will cause a vertical reciprocation of the fuel cleaning stem 26. The upper end of the cleaning stem 26, is provided with a cavity 32, as shown in Fig. 6, and the cleaning needle 37 is held in said cavity by the following described means. The cleaning needle is very small indeed; even as shown in the drawings it is very much exaggerated in size, and being made of very hard steel is very brittle and liable to break even in the process of mounting the same in the cleaning stem 26. For this reason I have devised the following means for securing the cleaning needle in the stem 26. The lower end of the needle 37 is bent in L-shape at 38; a small apertured nipple 39 is slid down upon this needle 37 until arrested by the L-shaped end 38, then the nipple 39 is inserted in the cavity in the upper end of the stem 26, and the upper end of said stem is pressed down to grip the nipple 39 firmly in place. It should be stated at this point, that in order to make the needle L-shaped, it is necessary to draw the temper at that point just a trifle so that the bending of the same will not break it. Considerable difficulty was experienced in inserting and holding the cleaning needle in the stem until this means was devised.

The upper open end of the tubular extension 24, is provided with a screw-threaded feeding nozzle 40, screwed into the tubular extension 24, as shown. This feeding nozzle is provided with an enlarged cavity on its lower side, as at 41, which cavity terminates in a very fine opening 42, slightly larger than the diameter of the needle 37.

The feeding device 7, is provided with an upward projection as at 43, which is provided with a vertical cavity 44, from which the lateral opening 45 leads for connection with the feed pipe 22, heretofore referred to. Screwed to the upper end of this projection 43, is an irregular shaped light feeding device as 46, provided with a fuel passage 47, in registry with the passage 44. On the upper side of this device 46, I provide an upwardly extending nipple 48, connecting the same with the pipe 49 by means of a union 50. The left-hand end of the device 46, as shown in Fig. 5, is provided with a T-shaped vertical extension 51, from which extends a lateral extension 52. The pipe 49 is carried vertically and then into arc shape and carried downwardly and connected by means of the union to the nipple 54 on the extension 52. The passage 55 leads from the pipe 49 into the central fuel passage 56 of the fuel feeding device for the light mechanism. I provide a nozzle 57, similar in all respects to the nozzle 40, and provide the same with a very minute fuel opening 58. In order to clean this nozzle I provide a cleaning stem 59, screw-threading the same into the T-head extension 51, and provide said stem with a cleaning needle 60, mounting said needle in the stem 59 in substantially the same manner as heretofore described and illustrated in Fig. 6.

The mixing chamber is shown in vertical section in Fig. 3. The central element of the mixing chamber is tubular and provided with the flared lower part 61 to set over the nozzle 40 and rest upon the flanges 62 upon the tubular element 24. As heretofore described, this chamber has the two lateral tubular air openings 12, said openings leading to the mixing chamber immediately adjacent to the nozzle 40, so that as the heated fuel is vaporized and passes through the nozzle, it is immediately met with the inrushing air with which it mixes and is carried to the upper portion of the chamber where it spreads out in the flat circular distributing chamber 63. This chamber is provided with openings 64 and 65, both below and above. The two lateral and downwardly extending tubular flues 11, conduct the mixed fuel to a point immediately above the pre-heating pan or reservoir 8.

As above indicated, I provide the spreader 13 to rest upon the upper circular distributing chamber 63 of the mixing chamber 9. The purpose of this spreader is to spread out the flame and direct the same in such a manner as to form a broad flat, yet concentrated flame. This spreader, however, is detachable, merely resting upon the upper portion of the mixing chamber and can be removed at will, and for various uses other devices may be substituted for it, as will hereinafter be described.

The lighting mechanism consists of substantially the same sort of mixing chamber as heretofore described. Supported upon the nozzle 57 is the mixing chamber 67, provided with the lateral openings 68, and the upper distributing T-head 69, from which the downward tubular extensions or flues 70, are carried to a point considerably below the level of the air openings 68. Upon the lower ends of these tubular extensions 70, are secured the ordinary incandescent mantles 71.

The operation of the device is as follows: When it is desired to start the burner, the pump 15 is operated to create a considerable pressure within the tank 1. A small quantity of alcohol, or any suitable fuel is poured into the pre-heating pan 8, and ignited, with the result that the fuel within the tube 18 is gasified and driven through the nozzle 40 into a fine jet and merges through the apertures 64 and 65 in the top and bottom of the mixing chamber, where of course, it may be ignited either by the application of a match, or directly from the flames arising from the fuel in the pre-heating pan 8, after which the combustion will be continuous. The two downwardly projecting flues 11, will direct a portion of the gasified fuel to their lower outlets, where, of course, it will become ignited and burn as a small flame and give off sufficient heat to keep the coil 19 at a sufficient temperature to gasify the fuel. It should be stated that the in-rush of the gas into the mixing chamber 9, will cause an in-rush of air through the lateral inlets 12, and produce the requisite mixture for combustion. The flame from the small apertures 64 and 65, is intensely hot and may be utilized for any purposes for which a heating flame is useful. The spreader 13, being a small flat disk of suitable dimensions, may be placed upon the disk-like part of the mixing chamber, as shown in Figs. 1, 2 and 3, where it serves to spread out the flame into a broad disk-like jet.

Should the opening 42, in the nozzle 40, at any time become clogged by dust or any solids from the hydro-carbon fuel, the stem 30 may be given a turn so as to reciprocate the cleaning needle 37. within the aperture. Normally, however, this cleaning needle is withdrawn into the extension 24 as shown in Fig. 5, at the left in connection with the lighting burner. It should be stated at this point that this cleaning needle is not in any sense a needle valve although if desired it may be used to restrict the opening 42 in the nozzle to reduce the fuel supply.

The same method of procedure is followed in lighting the lamp; a small amount of liquid fuel is poured into the pre-heating pan 72 and ignited, and after the globe valve 21 is turned on, the fuel will rise through the tube 22 to the projection 43, whence, of course, it finds its way through the passages 44 and 47, the arched tube 49, thence through the passages 55 and 56, to the nozzle 58, where it may be ignited. From the nozzle 58, it passes through the mixing chamber 67, and emerges through the mantles 71, where it may be ignited by the application of a match. As the jet emerges from the opening 58 in the nozzle, the air will pass through the passages 68, into the mixing chamber 67, where it will be mixed with the gasified fuel, and the heat generated at the mantles 71 will be sufficient to continue the gasifying of the fuel within the small arched tube 49, after the fuel in the pan 72 has burned out. If, for any reason, the opening 58 should become clogged by dust or any solids, the stem 59 may be screwed up and down to carry with it the needle 56' in order that the opening may be kept clean. Ordinarily, however, the cleaning needle is withdrawn into the burner, as shown in Fig. 5.

The same character of burner and mixing chamber may be utilized for use of plumbers and tinners in the following manner: The upper end of the distributing chamber 63, is provided with the central screw-threaded aperature 73, in which a short nipple 74 is screwed, and upon the upper end of said nipple is located a hollow circular chamber 75, provided with openings 76 upon its lower side. The mixture from the chamber 9 will pass upwardly through the chamber 63, into the nipple 74 and through the openings 76, where the mixture is ignited and forms an intense heating flame in conjunction with the jets of flame flowing upwardly through the openings 65 in the upper face of the distributing chamber 63. Soldering iron, and like utensils may be inserted into this flame and very quickly heated.

If desired, I may provide the upper circular chamber 63 with lateral gas conducting flues 77, and lead them to some distance away, and provide their extremities with chambers 78, in all respects similar to the chamber 63, with the openings 79 therein for the jets of the heating flame. A device of the latter description may be used in a cooking range where several jets may be supplied from a single source or mixing chamber.

If desired, I may insert the circular plate 80 within the combustion chamber 4, locating the same just above the two air flues 12. This plate, in order to insert the same in place and permit its ready removal, is made in halves, the halves being bolted together, as shown at 81. It is also provided with numerous apertures in its face as shown at 82; it may also be cut out to permit the same to properly surround the mixing chamber with the downwardly directed flues 11, and also for the upwardly directed extension 43. This plate serves to concentrate the heat from the flames at the lower ends of the flues 11, at the point where it will maintain the requisite temperature around the air inlets 12 and also around the lower end of the mixing chamber 9.

The burner is capable of many uses where an intense heating flame is desired, and its adaptation to any other use than those herein suggested would readily occur to those skilled in the art and needs no further elaboration here. It will thus be seen that I have provided a liquid fuel burner capable of producing an intense heating flame, and that I utilize in said burner a peculiar form of mixing chamber having a pair of return flues for the purpose of not only heating the liquid fuel to the point of gasification, but also I use the same heating flame for raising the air to be mixed with the fuel to a corresponding temperature so that both the air and the gasified fuel are at substantially the same temperature at the time they are mixed. This I regard as a very important feature of my invention, and it will be noticed that I utilize the same principles of construction both in the heating burner and in the lighting burner. Various changes, of course will occur to those skilled in the art whereby the burner may be adapted for purposes not herein specified.

I claim:

1. In a liquid fuel burner, the combination of a fuel jet projecting means with a mixing chamber, said chamber being provided with oppositely directed, laterally projecting tubular air inlets located adjacent to said fuel jet, a distributing chamber above said inlets in communication with said mixing chamber, and a pair of downwardly directed flues leading from said distributing chamber to points below but adjacent to said air inlets.

2. In a liquid fuel burner, the combination of a fuel jet projecting means, a mixing chamber above said means, said chamber having at its upper end a broad circular distributing chamber and a pair of laterally projecting tubular air inlets adjacent to said jet projecting means, a pair of downwardly directed flues leading from said distributing chamber to points adjacent to said jet projecting means, said distributing chamber being provided with a plurality of fuel escape orifices.

3. In a liquid fuel burner, the combination of a fuel jet projecting means, with a vertical tubular mixing chamber, a broad, flat circular distributing chamber at the upper end of and in open communication with said mixing chamber, a fuel escape orifice in the upper face of said distributing chamber, a pair of diametrically opposite, downwardly directed flues leading from said distributing chamber to points adjacent to said jet projecting means, and a pair of oppositely directed, laterally projecting tubular air inlets leading into said mixing chamber at points immediately adjacent to said fuel jet.

4. In a liquid fuel burner, the combination of a fuel jet projecting means, with a coil of fuel pipe leading thereto, and located thereunder, a vertical mixing chamber into which the fuel jet is projected, a distributing chamber at the upper end of and in open communication with said mixing chamber, a pair of downwardly directed flues leading from said distributing chamber to points immediately adjacent to said jet projecting means and above said fuel pipe, and a pair of laterally extending air inlet tubes leading into said mixing chamber at points immediately adjacent to the fuel jet.

5. In a liquid fuel burner, the combination of a fuel jet projecting means with a mixing chamber associated therewith, a combustion chamber, within which said mixing chamber is concentrically located, oppositely directed, laterally projecting tubular air inlets located adjacent to said fuel jet, and extending from without said combustion chamber into said mixing chamber, a distributing chamber in communication with said mixing chamber, and a pair of downwardly directed flues leading from said distributing chamber to points below but adjacent to said air inlets.

6. In a liquid fuel burner, the combination of a fuel jet projecting means with a mixing chamber associated therewith, said chamber being provided with oppositely directed, laterally projecting tubular air inlets located adjacent to said fuel jet, a distributing chamber in communication with said mixing chamber, a pair of downwardly directed flues leading from said distributing chamber to points below said air inlets, a combustion chamber within which said mixing chamber is concentrically located, and a partition dividing said combustion chamber into upper and lower compartments.

7. In a liquid fuel burner, the combination of a liquid fuel jet projecting means, a mixing chamber above said means, said chamber having at its upper end a broad, circular distributing chamber, a pair of downwardly directed flues leading from said distributing chamber to points adjacent to said jet projecting means, said distributing chamber being provided with a plurality of fuel escape orifices, a combustion chamber within which said mixing chamber is concentrically located, and tubular air inlets extending from outside of said combustion chamber to said mixing chamber.

8. In a liquid fuel burner, the combination of a fuel jet projecting means, a mixing chamber above said means, said chamber having at its upper end a broad, circular distributing chamber, a pair of downwardly directed flues leading from said distributing chamber to points adjacent to said jet projecting means, said distributing chamber being provided with a plurality of fuel escape orifices, a combustion chamber within which said mixing chamber is concentrically located, and a horizontal partition within said combustion chamber to divide the same into upper and lower combustion compartments.

9. In a liquid fuel burner, the combination of a fuel jet projecting means with a vertical tubular mixing chamber, a combustion chamber within which said mixing chamber is concentrically located, a broad, flat distributing chamber at the upper end and in open communication with said mixing chamber, a pair of downwardly directed flues leading from said distributing chamber to points adjacent to said jet projecting means, and a pair of oppositely directed, laterally projecting air inlets leading from the open air through said combustion chamber into said mixing chamber at points immediately adjacent to said fuel jet.

10. In a liquid fuel burner, the combination of a fuel jet projecting means with a vertical tubular mixing chamber, a broad, flat distributing chamber at the upper end of and in open communication with said mixing chamber, fuel escape orifices in the upper side of said distributing chamber, a pair of diametrically opposite, downwardly directed flues leading from said distributing chamber to points adjacent to said jet projecting means, a pair of oppositely directed, laterally projecting tubular air inlets leading from the open air directly into said mixing chamber to a point immediately adjacent to said fuel jet, a combustion chamber within which said mixing chamber is concentrically located, and a partition within said combustion chamber dividing the same into upper and lower combustion compartments.

11. In a liquid fuel burner, the combination of a fuel jet projecting means with a coil of fuel pipe leading thereto and located thereunder, a vertical mixing chamber into which said fuel jet is projected, a distributing chamber at the upper end of and in open communication with said mixing chamber, a pair of downwardly directed flues leading from said distributing chamber to points above said coil of fuel pipe, a pair of laterally extending air inlet tubes leading into said mixing chamber at points immediately adjacent to said fuel jet, a combustion chamber within which said mixing chamber is concentrically located, and a partition dividing said chamber into upper and lower compartments.

12. In a liquid fuel burner, the combination of a fuel jet projecting means with a mixing chamber, a combustion chamber surrounding said mixing chamber, said mixing chamber being provided with oppositely directed, laterally projecting tubular air inlets located adjacent to said fuel jet, leading through said combustion chamber thereto, and a pair of downwardly directed flues leading for the upper end of said mixing chamber to points below but adjacent to said air inlets.

13. In a liquid fuel burner, the combination of a fuel jet projecting means, a mixing chamber located above and in alinement with said projecting means, a pair of laterally projecting tubular air inlets adjacent to said fuel jet and leading thereto from the open air, a pair of downwardly directed flues leading from the upper end of said mixing chamber to points adjacent to said projecting means whereby gasified liquid fuel and air may be heated before by the ignition of said fuel mixture as it emerges from said downwardly directed flues.

14. In a liquid fuel burner, the combination with a fuel outlet orifice, means for projecting a liquid fuel in gasified form through said orifice, a mixing chamber located immediately above said orifice, laterally projecting tubular air inlets leading into said mixing chamber adjacent to said orifice, a pair of downwardly directed flues leading from the upper end of said mixing chamber to points below but adjacent to said air inlets, and means for clearing said fuel orifice of any solid obstruction without closing the same.

15. In a liquid fuel burner, the combination of a fuel outlet orifice, means for projecting a liquid fuel in gasified form through said orifice, a mixing chamber, said mixing chamber being provided with oppositely directed, laterally projecting tubular air inlets located adjacent to said fuel orifice, a pair of downwardly directed flues leading from the upper end of said mixing chamber to points below but adjacent to said air inlets, and means for clearing said orifice of any solid or semi-solid obstruction without closing the same.

16. In a liquid fuel burner, the combination of a fuel outlet orifice, means for projecting a liquid fuel in gasified form through said orifice, a mixing chamber located above and in alinement with said orifice, a pair of downwardly directed flues leading from the upper end of said mixing chamber to points adjacent to said orifice whereby gasified liquid fuel may be heated by the ignition of said fuel as it emerges from said downwardly directed flues, and means for clearing said orifice of any solid or semi-solid obstruction without closing the same.

17. In a liquid fuel burner, the combination of a fuel outlet orifice, means for projecting a liquid fuel in gasified form through said orifice, a vertical mixing chamber, a pair of diametrically opposite, downwardly directed flues leading from the upper part of said mixing chamber to points adjacent to said orifice, a pair of oppositely directed, laterally projecting tubular air inlets leading into said mixing chamber at points immediately adjacent to said fuel orifice, and means for clearing said orifice of any solid or semi-solid obstruction without closing the same.

In testimony whereof, I have hereunto set my hand this 11th day of January, 1916.

THOMAS B. FERGUSON.

Witnesses:
L. M. SANDERS,
F. L. GREEN.

Copies of this patent may be obtained for five cents each, by addressing the "Commissioner of Patents, Washington, D. C."